US012112726B2

(12) United States Patent
Dominguez

(10) Patent No.: US 12,112,726 B2
(45) Date of Patent: Oct. 8, 2024

(54) REMOTELY ACTUATED DRUM PEDAL DEVICE AND METHOD

(71) Applicant: Juan Dominguez, Temecula, CA (US)

(72) Inventor: Juan Dominguez, Temecula, CA (US)

( * ) Notice: Subject to any disclaimer, the term of this patent is extended or adjusted under 35 U.S.C. 154(b) by 0 days.

(21) Appl. No.: 17/822,030

(22) Filed: Aug. 24, 2022

(65) Prior Publication Data

US 2024/0071341 A1 Feb. 29, 2024

(51) Int. Cl.
*G10D 13/11* (2020.01)

(52) U.S. Cl.
CPC .................................... *G10D 13/11* (2020.02)

(58) Field of Classification Search
CPC ............................... G10D 13/11; G10D 13/00
See application file for complete search history.

(56) References Cited

U.S. PATENT DOCUMENTS 5,458,039 A 10/1995 Ashby
6,271,450 B1 7/2001 Mackie
6,570,076 B1 5/2003 Kjellgren
7,449,626 B2 11/2008 Chen
8,633,366 B2 1/2014 Reddick
10,726,819 B1 7/2020 Hamilton
2005/0109192 A1* 5/2005 Miyajima ............ G10D 13/065 84/422.1

FOREIGN PATENT DOCUMENTS

CN 100367346 C 1/2005

* cited by examiner

*Primary Examiner* — Kimberly R Lockett
(74) *Attorney, Agent, or Firm* — Lori Sandman, Esq.

(57) ABSTRACT

The claimed invention is a device and method of use for remotely actuated drumming with traditionally foot-operated drum sets. It is capable of operation with existing drum kits and sets, and adds ability to actuate a drum beater using the hand, arm, or other appendage such as an amputee residual limb to actuate the drum pedal remotely. The device comprises a traditional drum pedal mounted upon a drum pedal base, extendable tubes including extension tubes and down tubes, hinge posts and hinges, T-fittings, connector tabs, and a dais. A dais or platform for actuating the device is removeably attached to the extendable tube. The hinged attachment at the drum pedal base allows the drum pedal base to move up and down, thereby moving the foot pedal mechanism and actuating a beater that strikes the drum surface, creating sound.

7 Claims, 5 Drawing Sheets

REMOTELY ACTUATED DRUM PEDAL DEVICE AND METHOD

CROSS-REFERENCE TO RELATED APPLICATIONS

Not applicable.

STATEMENT REGARDING FEDERALLY SPONSORED RESEARCH/DEVELOPMENT

Not applicable.

REFERENCE TO SEQUENCE LISTING, A TABLE, OR COMPUTER PROGRAM LISTING COMPACT DISC APPENDIX

Not applicable.

BACKGROUND OF THE INVENTION

The present invention relates generally to percussive musical instruments. More specifically, the invention disclosed herein relates to a drum set pedal assembly actuated remotely.

Percussion instruments involving drum sets that include multiple drums played together are frequently equipped with foot pedals to actuate them. Typically, a drum set is played with a pair of drumsticks or brushes in the hands for striking drum surfaces, and foot pedals with attached beaters configured to generate sounds by moving the feet. In some situations, a drummer's hands or feet might be otherwise occupied or unavailable, and it would be advantageous to have a remotely actuated drum pedal for a traditionally foot-actuated drum set.

Pedal mechanisms that accommodate various drumming systems have been disclosed. Adjustable drum pedals that allow an operator to adjust the position of the foot pedal in different directions are available for foot operation, and those that allow for setting the position of the beater for optimized foot action also exist. Various types of connected pedals provide for multiple percussive actions simultaneously, but they are also foot-operated.

The invention disclosed herein is useful for drummers who do not have the use of their hands and feet. Music has become therapy for many people who have been traumatically injured, paralyzed or have suffered amputation and cannot use one or more of their limbs. Listening to and engaging in playing music in general, and musical percussion, especially, has been shown to be therapeutic and aid in post-traumatic healing. For many veterans, accident victims and motor-challenged individuals, music is valuable medicine—it can help improve communication and connection with others, enable expression in a way that speech cannot, and can aid in treatment and healing of post-traumatic stress disorder (PTSD), emotional dysregulation, chronic pain and other physical and mental problems.

The present invention provides a device and method of using it that allows drumming through a foot pedal by engaging it with hand, arm, or other body movement. A raised dais connected with an existing, commercially available drum beater provides translation of the motor activity of the arm into what would traditionally be a foot-actuated drumming system. This allows individuals who are unable to use their feet to contribute musically and be enabled as percussionists individually or as part of a band.

BRIEF SUMMARY OF THE INVENTION

The claimed invention is a device and method of using it for remotely actuated drumming with traditionally foot-operated drum sets. It is capable of operation with existing drum kits and sets, and adds an option to actuate a drum beater using the hand, arm, or other body movement.

The device of the invention comprises a traditional drum pedal mounted upon a drum pedal base, extendable tubes including extension tubes and down tubes, hinge posts and hinges, T-fittings, connector tabs, and a dais. The drum pedal base is connected via a hinge to an extendable tube at a first end of the extendable tube. A dais, consisting of a relatively flat or planar surface, provides an area for positioning the hand, arm or other appendage such as an amputee residual limb to actuate the drum pedal remotely. The dais is removeably attached to the extendable tube via a hinge at a second end of the extendable tube. The hinged attachment at the drum pedal base allows the drum pedal base to move up and down, thereby moving the foot pedal mechanism and actuating a beater that strikes the drum surface, creating sound.

It is an object of the invention to provide a drum pedal actuated by remote movement.

It is another object of the invention to provide a method of drumming for use by individuals who do not have or are unable to use one or more limbs.

It is a different object of this invention to provide amputees, and others who do not have or are unable to use one or more limbs, a device capable of translating body movement to a traditionally foot-operated device for operation or actuation.

REFERENCE CHARACTERS USED IN THE DRAWINGS

1. dais
5. short hinge post
7. long hinge post
10. T-fitting
12. pop button [lock]
15. extension tube
20. down tube
25. hinge
30. drum pedal base
35. Drum pedal connector

DESCRIPTION OF THE INVENTION

Figure 1:
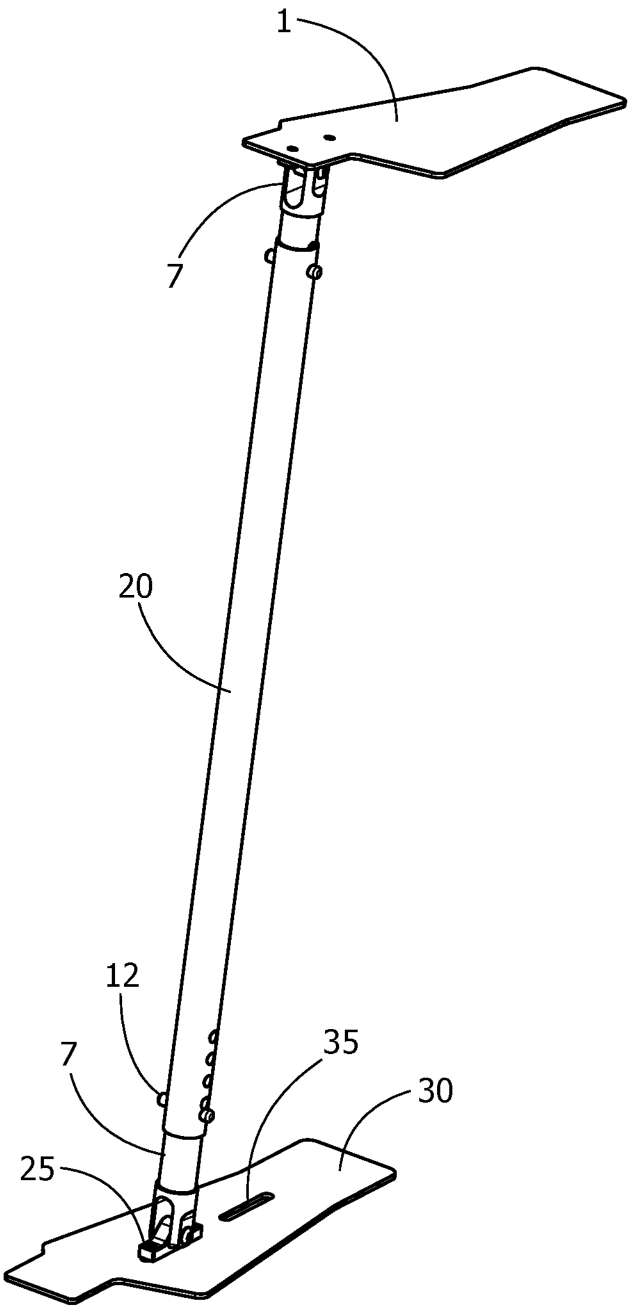
FIG. 1 is a perspective view of an embodiment of the device of the invention.

This description broadly describes some of the features of a remotely actuated drum pedal device and method in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention as herein described is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

FIG. 1 is a perspective view of an embodiment of the device of the invention. In this figure, a down tube 20 has a first end and a second end. At the first end, the down tube 20 connects with a drum pedal base 30 by an adjustably positionable hinge 25 that allows the down tube 20 to adjust and be fixed in place in order to position the device for users of different sizes, or to accommodate the use of different sticks or brushes, or to otherwise provide for individual physical needs. The device of the invention attaches to traditional, commercially available drum pedals; it attaches at the drum pedal connector 35, which serves as an attachment point, and can be used with a variety of commercially available drum pedals, with variously configured footboards and beaters. In a preferred embodiment, the drum pedal connector 35 is a slot or elongated aperture in the drum pedal base 30, and is capable of accepting a fastener that is also engaged with a commercially available drum pedal. An aperture drilled or cut into or through a drum pedal, conforming in size and shape to the drum pedal connector 35, can accept a fastener such as a screw, locking dowel, or pin fastener such as a cotter pin, ring, clip, or similar fastener which passes through both the drum pedal and the drum pedal base 30 at the drum pedal connector 35. One skilled in the art would appreciate that a variety of fasteners could be used, depending on the shape or performance requirements of the individual drum pedal, and remain within the scope of this invention.

At a second end of the down tube 20, a dais 1, or platform is connected to the device via a second adjustably positionable hinge 25. The dais 1 serves as a surface to support pressure that actuates the beater of the foot pedal attached to the drum pedal base 30.

Hinge posts, including short hinge posts 5 and long hinge posts 7, provide for adjustability as well as the ability to reposition attachments to the device. As illustrated in the embodiment shown in FIG. 1, pop buttons 12 can be used to releasably lock attachments, including the drum pedal base 30 at the first end, and the dais 1 at the second end of the down tube 20. The pop buttons 12 are capable of aligning, connecting, and securing the down tube 20 with short hinge posts 5 and long hinge posts 7 at either end by passing through apertures in the down tube 20 and the extension tubes 15. By depressing and releasing the pop button 12, it can be moved in and out of the apertures, allowing for releasable alignment, connection and locking of the attachments for use, easy assembly and detachability for transportation and storage of the device.

Figure 2:
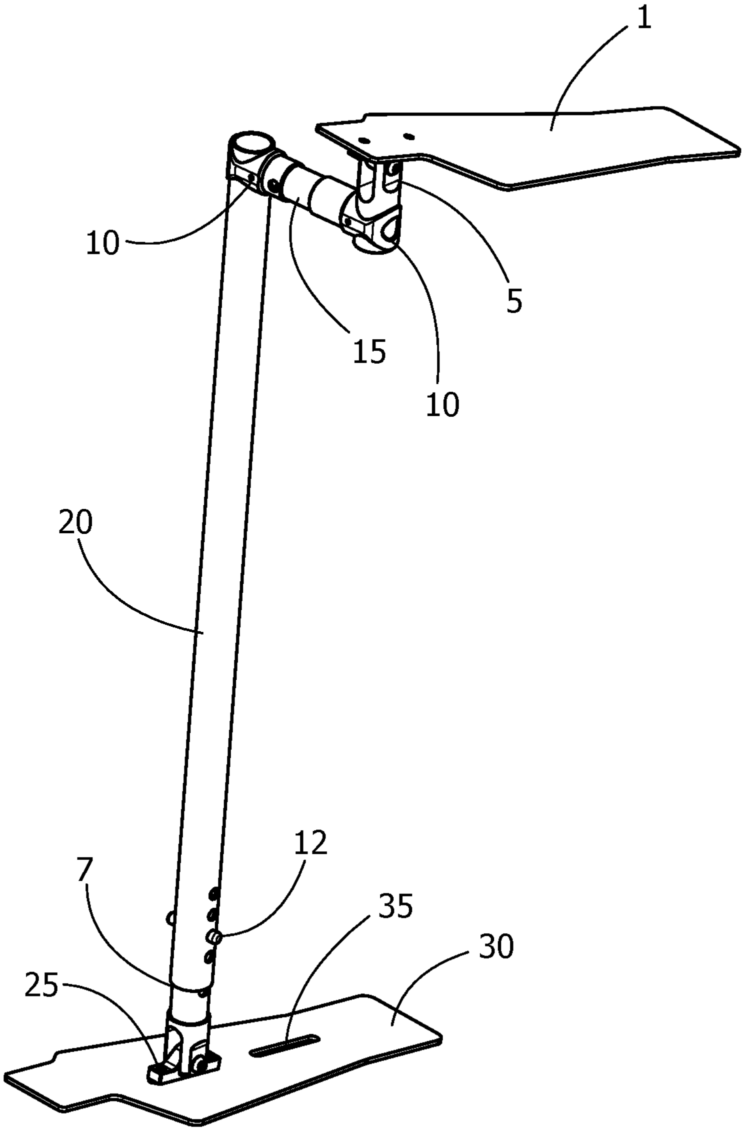
FIG. 2 is a perspective view of an alternate embodiment of the invention shown in FIG. 1, wherein the dais is extended.

In FIG. 2, a perspective view of an alternate embodiment of the invention shown in FIG. 1 is presented, wherein the dais 1 is extended to expand the ability to reach the device from various positions and in different configurations. Extension is enabled by addition of a short hinge post 5 connected on a first end with the second end of the down tube 20 by a T-fitting 10 capable of joining the substantially vertical down tube 20 with the substantially horizontal extension tube 15. At a second end of the short hinge post 5 another T-fitting 10 is positioned to connect the extension tube 15 of the short hinge post 5 with a hinge 25 which is further connected with the dais 1.

FIG. 2 also shows the attachment at the first end of the down tube 20 including the drum pedal base 30. In this embodiment, the drum pedal base 30 includes a drum pedal connector 35 slot for attachment with a drum pedal. The drum pedal connector 35 is a point, aperture, or slot capable of accepting a fastener engaged with a separate commercially available drum pedal and wherein the fastener is also releasably engaged with the drum pedal base. The drum pedal base 30 is mounted at the drum pedal connector 35 onto a drum pedal. The drum pedal base 30 is also connected via a hinge 25 with a long hinge post 7. Because of the variety of drum pedals available, including bass drum pedals from most manufacturers are configured differently, it should be understood that the drum pedal base 30 is mounted and fastened at the drum pedal connector 35 by a fastening means appropriate for the drum pedal desired. A pop button 12 is aligned and passed through one of a set of apertures on the extension tube 15 of the long hinge post 7 and also an aperture on the down tube 20 allowing for different device length to accommodate different and specific drummer needs.

Figure 3:
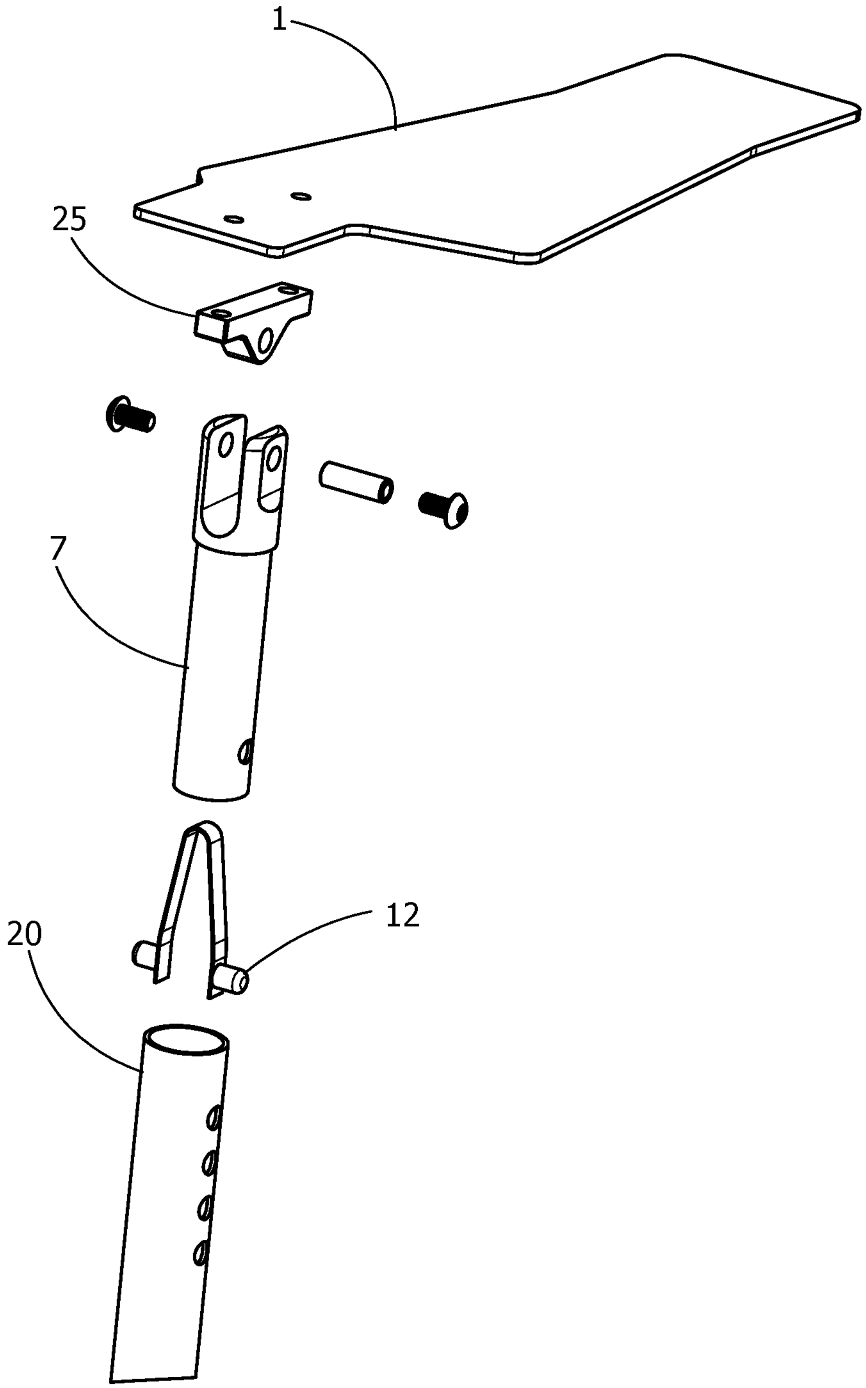
FIG. 3 is an expanded view of the fittings and connection of the device.

FIG. 3 is an expanded or exploded view showing the various fittings and connections of the device. In this view, the dais 1 includes two apertures that are aligned with apertures on a hinge 25, and is attached to the hinge 25 with fasteners passing through the apertures. In the embodiment presented in this figure, the hinge 25 includes one or more apertures that may be threaded or non-threaded, and provide one or more attachment points configured in size, location, and shape to fit a fastener such as a threaded screw capable of attachment to the dais 1 and releasably fastening it with a short hinge post 5. Alternatively, a long hinge post 7 could also be positioned here to further extend the dimensions of the device.

The short hinge post 5 or long hinge post 7 can be releasably connected to the down tube 20 with a pop button, such as that shown in FIG. 3. One skilled in the art would appreciate that a variety of connectors or fasteners that enable simple, rapid, stable, and releasable or detachable connection could be used and remain consistent with this disclosure. The pop button 12 is depressed by placing pressure on an extended portion that matingly conforms to apertures on the short hinge post 5, long hinge post 7, and the down tube 20. When the pop button 12 extended portion is aligned with said apertures, it passes through them connecting the short hinge post 5 or long hinge post 7 with the down tube 20.

Figure 4:
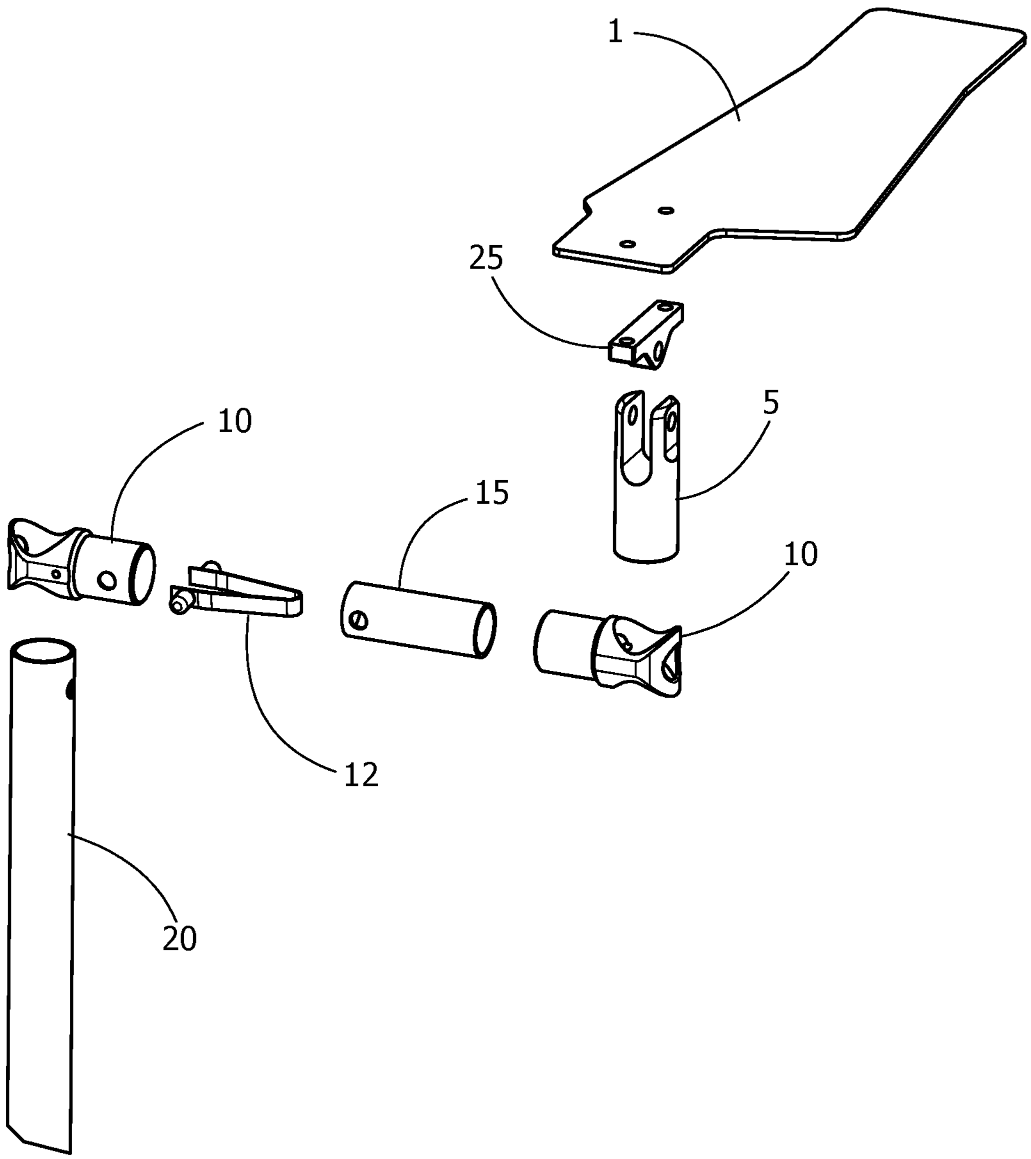
FIG. 4 is an expanded view of the embodiment presented in FIG. 2.

In FIG. 4, an expanded view of the embodiment presented in FIG. 2 is shown. The dais 1 is connected via a hinge 25 and T-fitting 10 with an extension tube 15. The extension tube 15 is aligned with and connected to the down tube 20 by a second T-fitting 10. The down tube 20 ultimately connects with the drum pedal base 30 as further described in and shown in FIG. 5.

Figure 5:
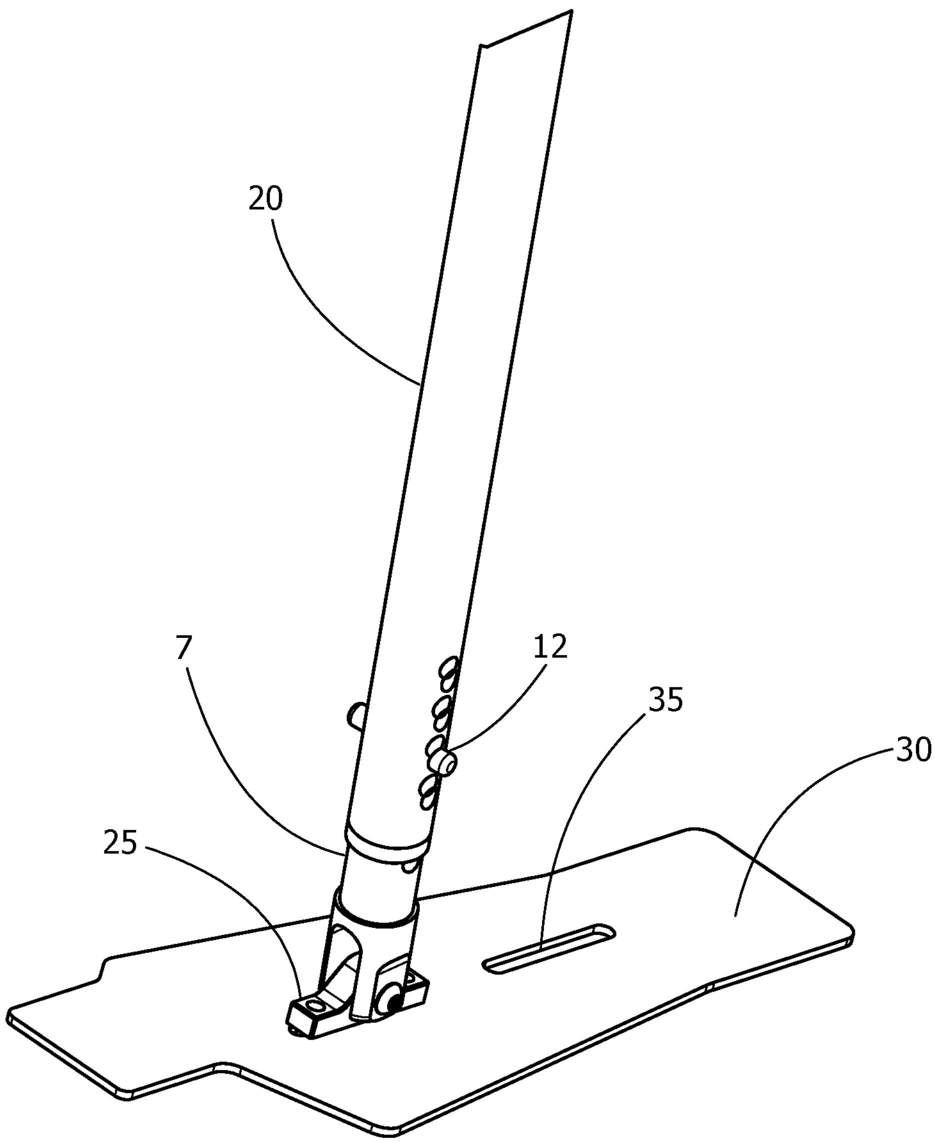
FIG. 5 is a detail of the hinge and drum pedal base connection to the device.

In FIG. 5, a detail of the hinge 25 and drum pedal base 30 and attachment points are presented. The down tube 20 connects with a pop button 12 to a long hinge post 7; a short hinge post 5 could be used but would render the device slightly less stable than if a long hinge post 7 is used in this location. The down tube 20 slides over and surrounds the short hinge post 5 or long hinge post 7, which is fastened to the hinge 25 such that it can be moveably positioned to place the device in a comfortable and accessible position by a drummer. Variable alignment positions can be achieved by adjusting the angle of the down tube 20 relative to the drum pedal base 30 and to the dais 20 by releasing the respective hinge fastener, moving the down tube forward or backward on the hinge 25, and fastening the fastener to secure the device in position. In one embodiment, the drum pedal base 30 is capable of being removed and replaced by a direct attachment of the down tube 20 with a separate commercially available drum pedal via the first hinge 25, and wherein the first hinge 25 is fastened directly to said drum pedal. It should be appreciated that the hinge and fasteners depicted in this figure are one possible embodiment and other hinge and fastener designs or configurations could be used and remain within the scope of this disclosure.

The invention also comprises a method of using the device. The method of using the device of the invention includes these steps; it should be appreciated that not all steps must be included and the order can be changed and still be consistent with this disclosure. The device is assembled by attaching the drum pedal base 30 of the device to a commercially available drum pedal. The drum pedal base 30 is connected to a hinge 25 and a short hinge post 5 or a long hinge post 7. The down tube 20 is connected by sliding it over the short hinge post 5 or a long hinge post 7, aligning apertures in both and positioning a pop button 12 therein to secure the down tube 20 thereon. The down tube 20 is positioned to place it in a comfortable and accessible position for use by a drummer and fastening it therein. The dais 1 is attached to a hinge 25 and a short hinge post 5 or a long hinge post 7, and then positioned to place it in a comfortable and accessible position for use by a drummer and fastening it therein. Pressure is applied to the dais 1 to engage the drum pedal base 30 and provide motion of the drum pedal base 30 upon the drum pedal to actuate sound. When the device is not in use, it is disassembled by removing all fasteners and separating the components of the device for storage or transportation.

The invention further comprises a kit for storing and transporting the device of the invention. The kit comprises at least the following: The device of the invention; replacement components for the device including one or more hinges 25, a plurality of replacement fasteners, one or more replacement pop buttons 12, and one or more replacement T-fittings 10; and a carry bag capable of containing and storing the device and replacement components.

I claim:

1. A device for remote actuation of a drum pedal, the device comprising:

i. a dais, wherein the dais further comprises a flat or planar surface and one or more apertures for positioning and aligning the dais with one of a plurality of hinges;

ii. the plurality of hinges, including at least a first hinge and a second hinge; wherein each of said hinges conforms to and connects with one of a plurality of hinge posts;

iii. the plurality of hinge posts including at least a first hinge post and a second hinge post, each hinge post comprising a first end and a second end, and conforming to and releasably connected at the first end with one of the plurality of hinges, and at the second end with a down tube via one of a plurality of T-fittings;

iv. the plurality of T-fittings, comprising at least a first end and a second end, wherein one of the T-fittings releasably attaches to the down tube by connecting with one of the plurality of hinge posts on the first end, and an extension tube on the second end, thereby connecting the dais with the down tube;

v. one or more pop buttons; said pop buttons are for aligning, connecting, and securing the down tube with hinge posts at either end of the down tube by passing the pop buttons through apertures in the down tube and extension tubes, wherein by depressing and releasing the pop button the down tube can be moved in and out of the apertures, allowing for releasable alignment, connection and locking the down tube in position;

vi. one or more extension tubes, further comprising apertures conforming to and aligning the one or more pop buttons;

vii. a drum pedal for applying pressure to the dais to engage the drum pedal base with the drum pedal and thereby motioning the drum pedal to actuate sound; and viii. the down tube further comprising a first end and a second end, and wherein the first end is releasably connected via the first hinge post and hinge to the drum pedal base and also releasably connected to the dais at the second end via the second hinge post and hinge.

2. The device of claim 1 wherein the dais is comprised of a rigid carbon fiber.

3. The device of claim 1 further including a drum pedal connector; said drum pedal connector is a point, aperture, or slot for accepting a fastener engaged with the drum pedal and wherein the fastener is also releasably engaged with the drum pedal base.

4. The device of claim 1 wherein the plurality of hinge posts may include short hinge posts and long hinge posts, and wherein said short hinge posts or long hinge posts are each fastened to one of the plurality of hinges wherein it can be moveably positioned to place the device in a comfortable and accessible position by a drummer.

5. The device of claim 1 wherein the drum pedal base can be removed and replaced by a direct attachment of the down tube with a drum pedal via the first hinge, and wherein the first hinge is fastened directly to said drum pedal.

6. The device of claim 1 wherein the one or more extension tubes further comprises apertures for interacting with pop buttons to secure the extension tubes in place on said device when the pop buttons are engaged.

7. A method of using the device of claim 1, wherein the method comprises at least the following steps:

a. attaching a drum pedal base of the device to a drum pedal;

b. connecting the drum pedal base to a hinge and either a short hinge post or a long hinge post depending on the desired positioning relative to the drummer;

c. attaching a down tube by sliding said down tube over either the short hinge post or long hinge post, aligning apertures in both the down tube and the hinge post, and positioning a pop button therein to secure the down tube thereon;

d. positioning the down tube to place it in a comfortable and accessible position for use by a drummer and fastening it therein;

e. attaching a dais to a hinge and a short hinge post or a long hinge post;

f. positioning the dais to place it in an accessible position for use by a drummer and fastening it therein;

Applying pressure to the dais to engage the drum pedal base and provide motion of the drum pedal base upon the drum pedal to actuate sound h.

* * * * *